United States Patent
Baker et al.

[11] Patent Number: 5,839,216
[45] Date of Patent: Nov. 24, 1998

[54] MARINE HARVESTING AND PROCESSING APPARATUS

[75] Inventors: Garyn Phillip Baker, Ogden; Gary Lynn Baker, Brigham City, both of Utah

[73] Assignee: International Aquaculture Technology, Inc., Salt Lake City, Utah

[21] Appl. No.: 698,092

[22] Filed: Aug. 15, 1996

Related U.S. Application Data

[63] Continuation of Ser. No. 489,809, Jun. 13, 1995, abandoned.

[51] Int. Cl.⁶ .................................................. A01K 81/04
[52] U.S. Cl. ............................................................ 43/6.5
[58] Field of Search ...................... 43/6.5; 56/9; 210/30, 210/40, 96, 662, 242.1; 414/137.7

[56] References Cited

U.S. PATENT DOCUMENTS

| | | | |
|---|---|---|---|
| 1,717,835 | 6/1929 | Calhoun | 43/4 |
| 3,768,193 | 10/1973 | London | 43/6.5 |
| 3,775,890 | 12/1973 | Puretic | 43/6.5 |
| 3,783,535 | 1/1974 | Hanks | 43/6.5 |
| 3,913,254 | 10/1975 | Puretic | 43/6.5 |
| 3,951,805 | 4/1976 | Dodd | 210/193 |
| 3,992,292 | 11/1976 | Grimes | 210/30 |
| 4,105,554 | 8/1978 | Janson | 210/96 |
| 4,165,282 | 8/1979 | Bennett | 210/40 |
| 4,258,534 | 3/1981 | Bryant | 56/9 |
| 4,341,637 | 7/1982 | Smith | 210/662 |
| 4,663,879 | 5/1987 | Bergeron | 43/6.5 |
| 4,944,108 | 7/1990 | George | 43/6.5 |
| 4,998,369 | 3/1991 | Lamon | 43/6.5 |
| 5,042,187 | 8/1991 | Bentzley | 43/6.5 |
| 5,399,054 | 3/1995 | Hines | 414/137.7 |
| 5,593,579 | 1/1997 | Reynolds | 210/242.1 |

*Primary Examiner*—Kurt Rowan
*Attorney, Agent, or Firm*—Workman, Nydegger & Seeely

[57] ABSTRACT

Marine harvesting and processing apparatus are provided for harvesting marine life from a body of water. The apparatus includes a continuous belt which is partially submerged in the water. A flow of water is created which forces organisms against the moving belt and the belt then lifts the organisms into the vessel. The belt produces a separation of larger organisms from smaller organisms. The organisms may then be passed through a filtering system comprised of a tube with a formed wire spirally wound thereabout. The spacing between the wound wire may be varied so that only organisms of a specific size may pass therethrough. As a result, only filtered organisms need be transported to shore thereby providing for a more efficient system and allowing the ship to transport more of the desired organism and less detritus.

2 Claims, 5 Drawing Sheets

MARINE HARVESTING AND PROCESSING APPARATUS

This application is a continuation of application Ser. No. 08/489,809, filed Jun. 13, 1995, now abandoned.

BACKGROUND

1. Field of the Invention

This invention relates generally to the harvesting of marine life from bodies of water, but more specifically to methods and apparatus for the harvesting of the types of marine life available near the surface of the water, for example brine shrimp and brine shrimp roe, jelly fish, kelp, and other creatures that live within the upper ten feet below the surface of the body of water. Although some preferred embodiments presented herein are directed to the harvesting of roe and small invertebrates, it will be appreciated that this technique can also be used for harvesting other types of plants and marine life.

2. Background Art

Harvesting marine life from bodies of water has been a significant source of nutrition for mankind throughout history. Although advancements in watercraft have allowed vessels to become faster and larger, increases in the amount of fauna harvested generally focus on enlarging age-old methods. For example, although fishing line and nets have been used for centuries, it has been only recently that technology has allowed the use of miles-long drift nets pulled behind huge ships. Although these changes in the scope of harvesting techniques have resulted in larger yields, they have not significantly advanced the technology used in harvesting marine life.

Although larger nets can be utilized for harvesting of fish, the harvesting of smaller species which tend to live near the surface is usually accomplished through the use of small nets having small openings. The small size of the openings not only prevents escape but also prevents the rapid removal of water. These harvesting techniques therefore often require the use of cranes or other machinery to enable lifting of the fine meshed nets or bags out of the water and to handle the bags once they are aboard the ship. These bags are then typically unloaded on shore and then their contents are processed and stored for land transport. The disadvantage to this method is that, in addition to the harvested marine life, an abundance of water, unwanted species and detritus is also collected in hauled to shore.

It would therefore be an advancement in the art to provide a method for harvesting marine life which does not require the lifting of heavy containers during the harvesting and processing of the catch.

It would be another advancement in the art to provide a method which allows for the screening of the detritus from the harvest so that only the desired catch need be transported to land.

OBJECTS AND BRIEF SUMMARY OF THE INVENTION

It is therefore, an object of the present invention to provide methods and apparatus for harvesting marine life which do not require the lifting of heavy containers.

It is another object of the present invention to provide methods and apparatus for harvesting marine life which allow for the initial processing and screening of the harvest so that only the desired species need be transported to land.

It is yet another object of the present invention to provide methods and apparatus for harvesting marine life which can be rapidly deployed to the site for harvesting.

It is a further object of the present invention to provide methods and apparatus for harvesting marine life which allow for a more rapid harvesting to occur.

Additional objects and advantages of the invention will be set forth in the description which follows, and in part may be derived from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, methods and apparatus are provided for harvesting marine life utilizing a moving belt-type skimmer which is placed in the water from a ship. The belt is constructed of a material having a pore size and material which allows the selected species to be lifted from the water and carried up the belt and deposited in the ship. A boom is placed on the surface of the water and extends to a depth therebelow to initially accumulate the harvest and direct the harvest onto the moving belt. The harvest may be adhered to the belt either by the motion of the ship through the water, or by the use of propulsion induced flow such as that taught in U.S. Pat. No. 3,992,292, which is hereby incorporated by reference.

After the marine life has been moved up the belt and the belt has revolved around its highest elevation and has started to return to the lower elevation, a spray bar placed between the two belt layers sprays in a downward direction through the lower portion of the belt thereby removing the harvest from the belt and depositing the harvest in a holding tank. Depending on these species to be harvested, the contents of this holding tank can be pumped to compartments within the ship for settling and later removal of the desired strata within the settled components of the compartment, or the contents can be immediately skimmed and a detritus pumped off the ship. Although it will be appreciated that the portion of the present invention utilizing the moving belt can be utilized with a ship without compartments where the entire contents of the harvest are shipped to land, it is preferred to utilize a ship that has several compartments built therein.

Utilizing this configuration of ship, the harvest may be allowed to settle in some compartments and the desired strata may then be removed and pumped into another compartment resulting in a cleaner catch. The remainder can then be pumped overboard and the compartment can be reused. In this manner, only the catch need be shipped back to shore and the ship can remain on the harvesting grounds longer before reaching the capacity of the ship. This not only results in a more economical harvesting process, but also eliminates some of the processing steps at the processing plant on the shore.

When harvesting very small marine life such as brine shrimp or brine shrimp roe, yet another aspect of the present invention may be utilized to further process the catch in situ. For example, since brine shrimp roe float, the harvest being removed by the spray bar off of the moving belt can be placed in a settling compartment and only the materials floating in that compartment may be pumped into a separate compartment. It will be appreciated that for other species, it may be more desirable to pump the lower portion of the compartment or pump a portion of the compartment in between the upper and lower strata.

After the brine shrimp roe has been removed from the compartment, the remainder of the material in the compartment can be pumped overboard. The brine shrimp may then be pumped over to another compartment or may be pumped to a roe separator.

In yet a further aspect of the present invention, a roe separator is provided comprising two thin cylinders which are submerged into a compartment into which the brine shrimp roe are pumped. The cylinders are comprised on longitudinal rods to which stainless steel fins are welded. The fins are created by spirally winding a formed wire around the longitudinal rods. The spaces between the formed wires are carefully controlled so that only the desired species may pass between the fins to enter the hollow center of the tube. For example, when used with brine shrimp roe, the roe separators utilize fins which are spaced apart only enough for brine shrimp roe to pass therethrough. After the roe separators are rotated within this submerged compartment for a time, the lower pressure within the hollow roe separator cylinders cause the brine shrimp roe to enter the cylinders through the fins and to be carried to yet another compartment. Any material in the shrimp roe separator compartment which is too large to pass through the fins is then be pumped overboard. This is especially useful when harvesting brine shrimp roe in shallow or muddy waters wherein mud and adult brine shrimp may be inadvertently harvested in addition to the roe.

Once the roe has passed through the roe separator, the roe then is pumped into a final compartment for shipping. By utilizing each of the aforementioned processing steps, nearly all of the processing which would normally take place on land can be accomplished in situ resulting the transport of only the pure harvest. The aforementioned methods and apparatus do not require any lifting of any nets or sacks and thereby greatly reduce the amount of effort that need to be expended in harvesting. Yet another advantage of the aforementioned apparatus is that the harvest may be pumped directly from the ship to a transport truck thereby completely eliminating the need for a processing plant.

Although brine shrimp roe has been used as an example to demonstrate the advantages of the invention, it will be appreciated that many other species may also be harvested utilizing this technique with only minor alterations to the equipment. For example, the spacing of the fins on the roe separator can be increased to accommodate a larger species. It will also be appreciated that as the size of the species increases, it might prove advantageous to reverse the role of the separator and allow any detritus smaller than the catch to enter the separator and to be pumped overboard while removing the contents of the compartment which is too large to pass through the separator. The catch remaining in the compartment could then be pumped into a compartment of the ship. Similarly, the shape of the boom and the speed of the belt and the material used on the belt may also be altered within the teachings of the present invention to provide for advantages in harvesting selected species.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1A:
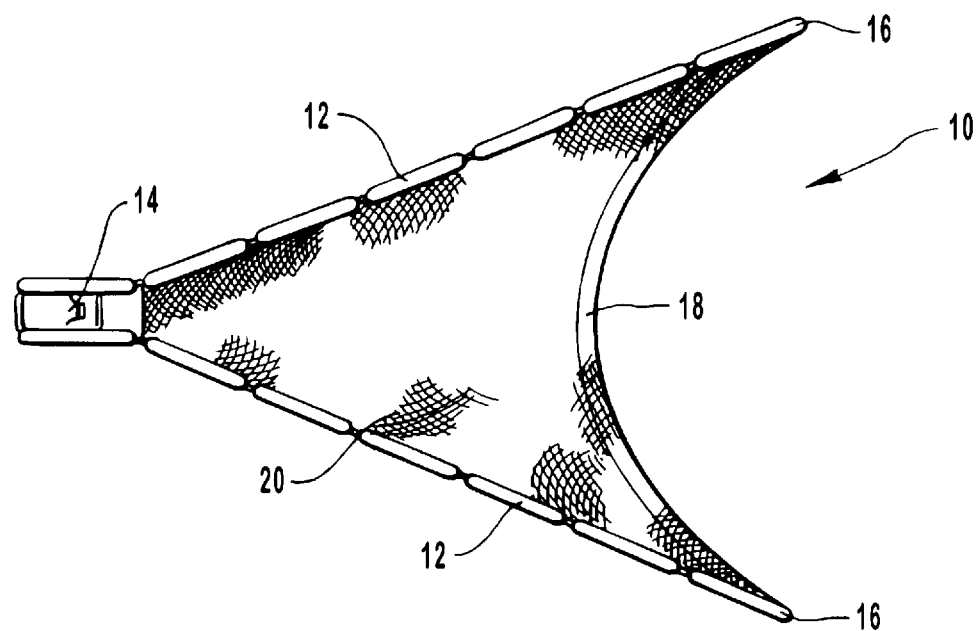
FIG. 1A is a plan view of a boom system used in conjunction with the present invention.

Referring first to FIG. 1A, one embodiment of a means for concentrating marine life is illustrated. A trawl 10 is shown having two booms 12 connected to an aperture box 14 and extending outwardly therefrom. Each of booms 12 have a deployed end 16 to which a lead line 18 is attached. Lead line 18 serves to hold deployed ends 16 together to form a generally triangular form to the plan view of trawl 10. Lead line 18 is comprised of a flexible yet heavy material such as steel cable so that the lower edge of a fabric 20 is held submerged below the surface of the water while booms 12 remain floating on the surface. Lead line 18 thereby forms a leading edge of fabric 20.

Figure 1B:
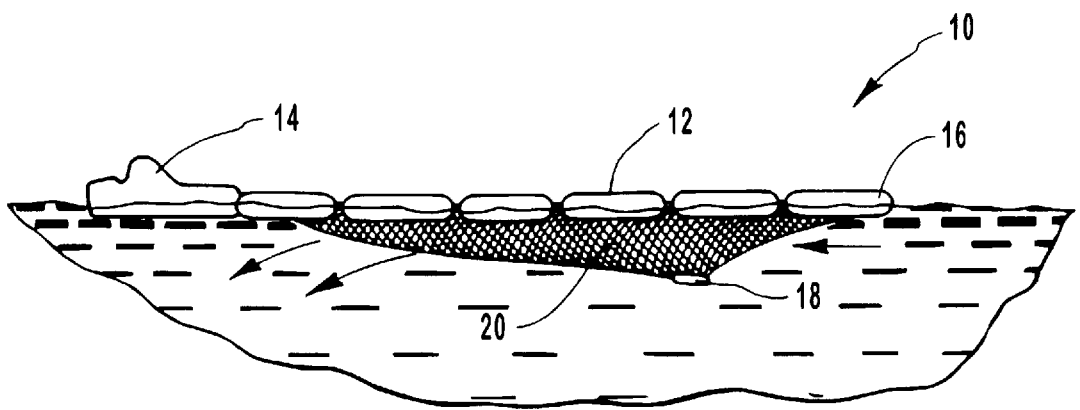
FIG. 1B is an elevational view of the boom section presented in FIG. 1A.

Turning now to FIG. 1B, the purpose of lead line 18 can be better visualized. In the embodiment illustrated in FIG. 1B, the trawl is designed for harvesting marine life present in the first few feet below the surface of the water. Any organism that enters over lead line 18 will be forced by the flow of water to travel up fabric 20 into aperture box 14. Fabric 20 is a porous material having a pore size designed to allow water to pass therethrough, but preventing the passage of the organisms to be harvested. In the embodiment illustrated in FIGS. 1A and 1B, a device is placed near aperture box 14 to create a flow of water toward aperture box 14. The organisms are thereby concentrated in aperture box 14 and may be harvested therefrom. It will be appreciated, however, that in some applications it may be preferable to merely propel the ship in a forward motion to create the same current driving the organisms into the aperture box.

For example, in one embodiment of the present invention, a vessel is designed so that the front of the vessel may be slightly submerged, the bow of the vessel having a shape capable of funneling the organisms directly in front of the bow into an aperture from which they may be harvested. Likewise, booms 12 although comprised of a buoyant flexible material in the illustration shown in FIGS. 1A and 1B, may also be of a rigid buoyant material or of a nonbuoyant material which is suspended from the ship. The overall size of trawl 10 may also be varied depending upon the species being harvested. In the embodiments in which trawl 10 is propelled forward, the pore size may be enlarged so that sufficient water will flow through trawl 10.

Figure 2:
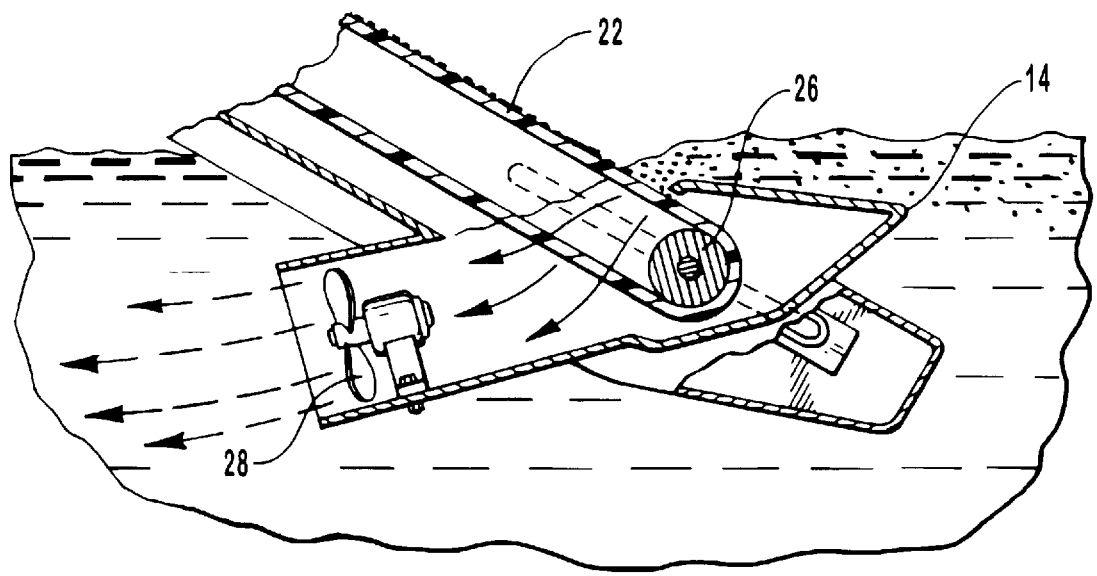
FIG. 2 is a perspective view of a lower portion of the belt system partially emerged in water.

After the organisms to be harvested have been concentrated in aperture box 14, the organisms are lifted out of the water and are placed in a settling compartment. To accomplish this, means for elevating the organisms to the settling compartment are provided. In the embodiment illustrated in FIG. 2, the means for elevating comprise a movable belt 22, a motor 24 (shown in FIG. 3), and rollers 26. As the organisms are concentrated in aperture box 14, the organisms are forced by the flow of water created by propeller 28 onto belt 22. The width of belt 22 will vary depending on the species being harvested and on the methods utilized for creating the current against belt 22. For example, although propeller 28 is utilized in this embodiment, any of the known means for propulsion such as jet nozzles or the motion of the vessel in a forward direction can create the appropriate flow to force the organisms onto belt 22. At the lower end of belt 22, the path of the belt is guided around roller 26 and although not shown in this illustration is guided around an equivalent roller at the top of the belt. The roller 26 is journaled on an axle supported by and extending between side plates of a movable support frame. When the harvesting is completed, the entire support frame may be removed from the water so that the ship may return to shore without the drag of the belt being in the water and preventing damage to the belt and aperture box. The tension on the belt is maintained by a hydraulic piston and cylinder as is well known in the art. Preferably, the endless belt 22 is driven by a hydraulic motor through a chain and sprocket drive. The direction of drive is such that the upper stretch of belt 22 moves upwardly out of the water.

During operation, the organisms forced against the belt are carried upwardly on the belt and are deposited in a settling compartment. In the brine shrimp roe example, an aramid or kevlar belt is covered with a number 110 sized silk screen pad to aid in holding the roe. Other belt covers may be developed to assist in holding other marine life.

Figure 3:
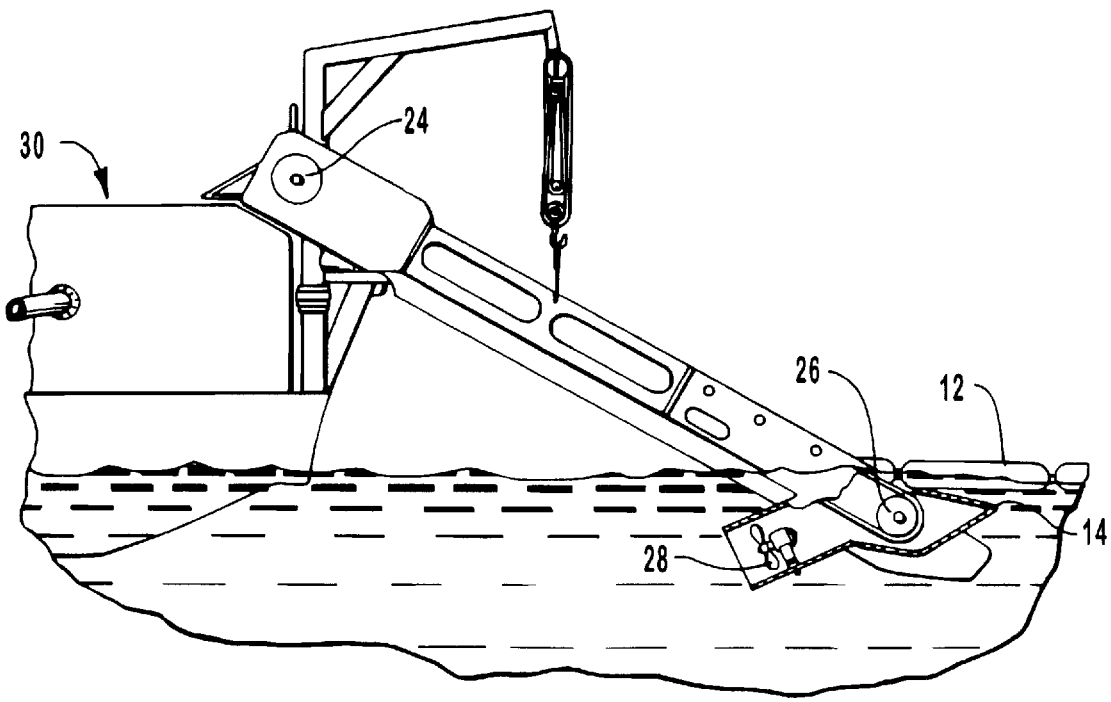
FIG. 3 is a perspective view of the belt system.

As can be seen more clearly in FIG. 3, a settling compartment 30 is shown located below the upper end of belt 22. Although larger organisms 31 will fall off the belt when the belt is inverted and begins its downward path, many smaller organisms 32 must be forcefully removed from the belt. To accomplish this removal of the smaller organisms now separated from the larger organisms and imbedded on the belt, a spray bar 33 is placed between the upward stretch and lower stretch of belt and is positioned so as to spray through the downward stretch of belt 22. Any organisms embedded in or held upon belt 22 will be removed from the belt and will fall into settling compartment 30.

Figure 4:
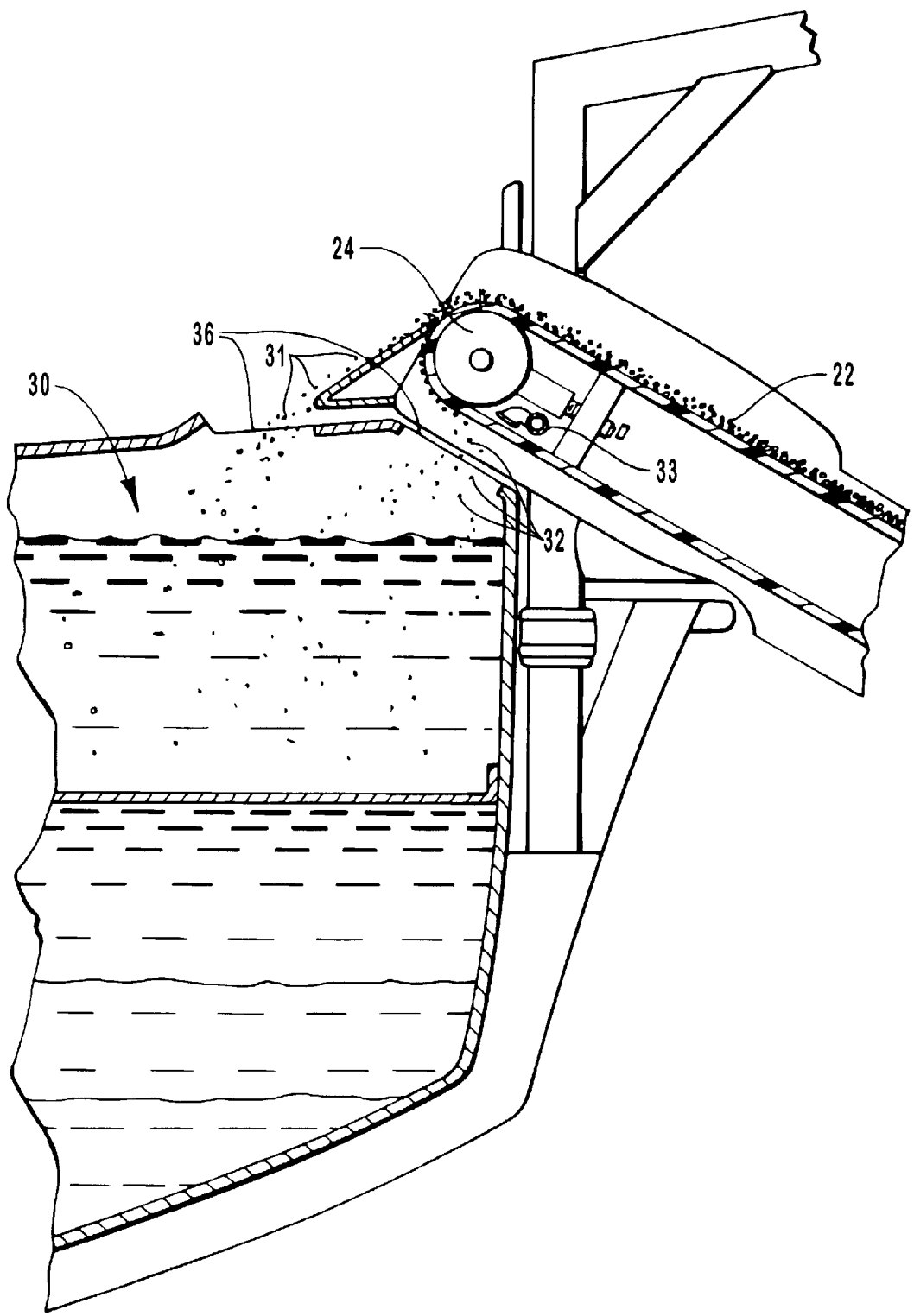
FIG. 4 is an elevational view of the upper portion of the belt system particularly demonstrating the spray bar.

Turning now to FIG. 4, a more detailed view is presented of the path through which the organisms will be moved after the organisms have been removed from belt 22. Although one settling compartment 30 is shown in the illustration, for larger operations or operations involving small organisms which take longer to settle, it may be preferred to have an intermediary compartment which is selectively pumped into several settling compartments. In this manner harvesting can continue while the contents of several compartments are settling.

Figure 5:
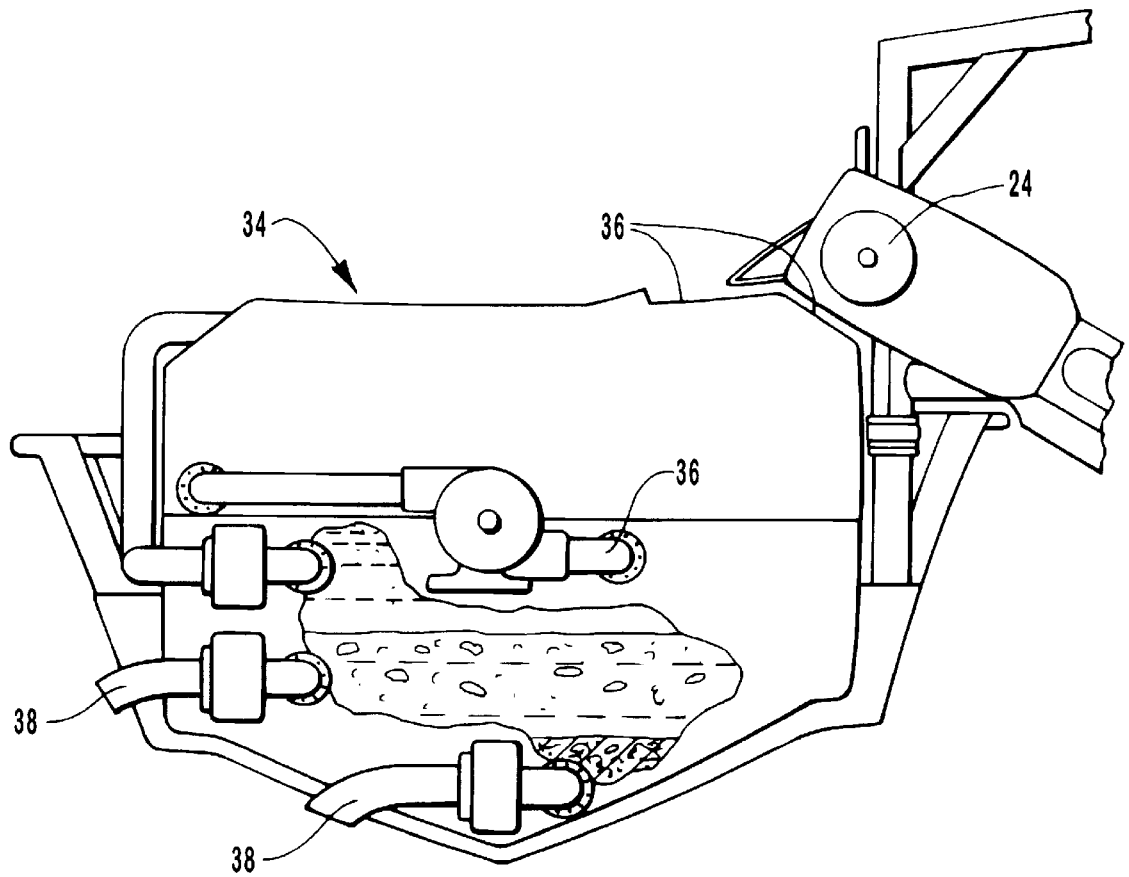
FIG. 5 is a cross-sectional view of a compartment into which the materials sprayed from the belt by the spray bar in FIG. 4 are contained.

Turning now to FIG. 5, a settling compartment shown generally as 34 is depicted having an inlets 36 and several exits 38. Depending on the species being harvested, any of exits 38 may be utilized to skim the settled contents of settling compartment 34. The brine shrimp roe example given previously, the brine shrimp roe floating on the surface would be pumped through the uppermost of exits 38 to another compartment of the ship for storage or for processing. The lower most of exits 38 could then be used to drain the compartment and eject the material overboard in preparation of the refilling of the compartment for settling of further harvest.

Figure 6:
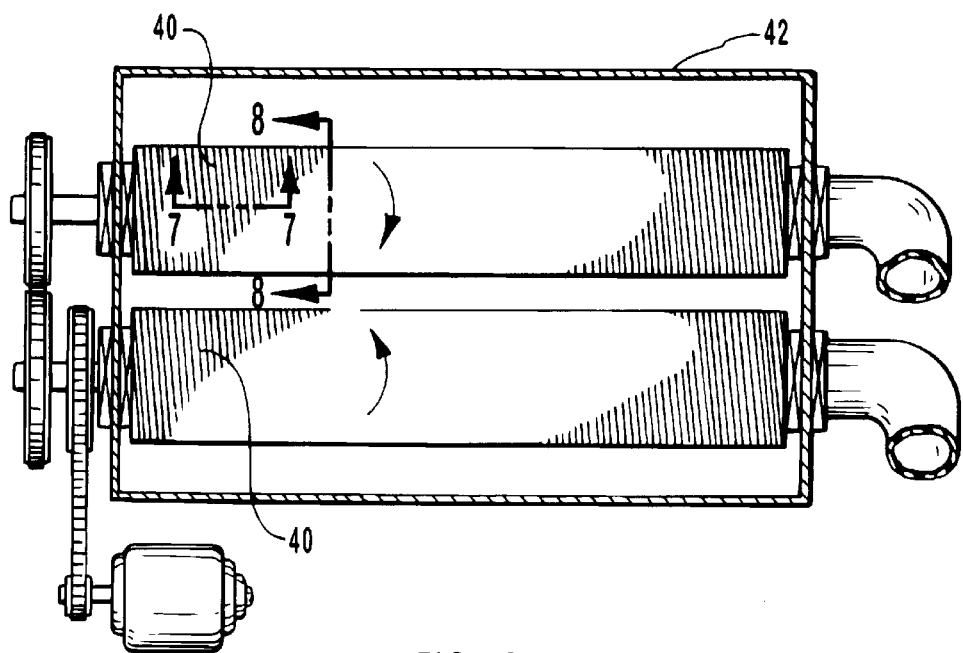
FIG. 6 is a plan view of one embodiment of the filtering means.

FIG. 6 is a plan view of one embodiment of a means for filtering utilized in the present invention. In the embodiment depicted in FIG. 6, the means for filtering comprise two elongate filter tubes 40 housed within a filter tank 42. Filter tubes 40 are suspended at each end in filter tank 42 with bearing surfaces to allow the tubes to rotate within the tank. One end of each of filter tubes 40 is opened and is sealed into an opening into the side of filter tank 42 to allow water and organisms which collect inside of the tube to pass through the tube and to be stored in a separate compartment. In use, filter tank 42 is filled until filter tubes 40 are submerged. Filter tubes 40 are counter-rotated within filter tank 42. Filter tubes 40 are constructed of a closely spaced wire mesh which serves to allow the passage of water and appropriately sized organisms therethrough. Upon entering the inside of tubes 40, the organisms and water flow to the end and leave filter tank 42. Any material in filter tank 42 which is of a size too large to pass through filter tube 40 will remain in the tank and then can be pumped overboard.

It will be appreciated that although the embodiment illustrated in FIG. 6 utilizes two filter tubes, any number of filter tubes may be utilized depending upon the species to be harvested. Likewise, the spacing between fins or mesh on the filter tube can be varied depending on the species. In the embodiment illustrated in FIG. 6, the fins or mesh are constructed with stainless steel which is resistance welded to a conduit passing through tube 40. The conduit has openings which allow the passage of water and organisms therethrough. Because of the pressure gradient developed from having a hollow tube with a fine mesh surrounding the tube, there is a gentle flow which develops from the outside of filter tank 42 to the inside of filter tubes 40. The pressure and rate of this flow may be modified by spacing spirally wound wire.

Figure 7:
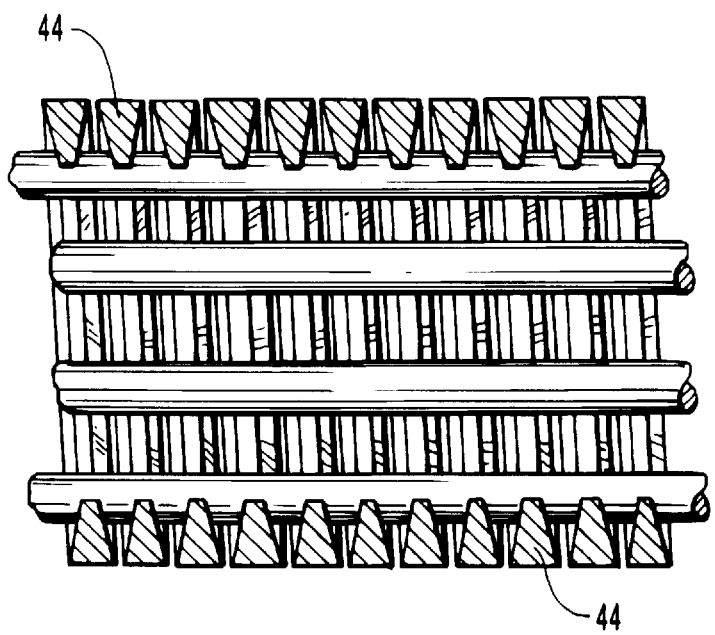
FIG. 7 is a cross-sectional elevational view of the embodiment of the filtering means shown in FIG. 6.

FIG. 7 is an elevational view of the filter tank shown in FIG. 6. Filter tubes 40 are counter rotated using any of the known mechanical means for rotating a tube such as a gear and a chain system attached to a hydraulic motor.

A formed wire 44 is wrapped in helical fashion around a series of rods which extend the length of filter tube 40. A round wire which has been passed through a compressor is formed into a generally triangular shaped wire shown in FIGS. 6–8. As the wire is wound over the longitudinal rods, the wire becomes resistance welded to the rods with the large end of the triangle being spaced apart from the next revolution of the wire an appropriate distance. For example, when harvesting brine shrimp roe, a spacing of approximately $15/1000$ of an inch is utilized. For much of the material which is harvested, the spacing will be too small to penetrate and the material will remain in the filter tank to be pumped overboard. The material which is fine enough to pass through the spacing between the formed wires or fins will enter filter tube 40 and pass out at the end of filter tube 40 into a compartment.

Figure 8:
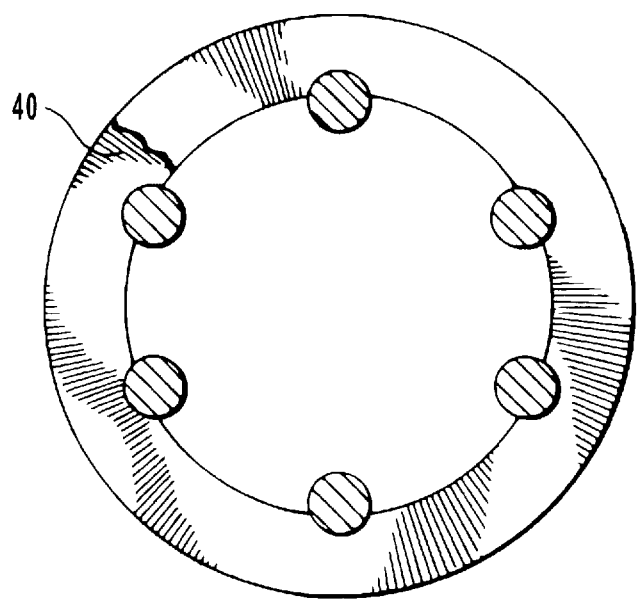
FIG. 8 is a cross-sectional end view of one of the filter.

FIG. 8 is a cross-sectional view of one of the filter tubes 40 illustrated in FIGS. 6 and 7. A cross-section, the longitudinal rods, the hollow core, and the formed wire can be clearly seen.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An elevatable apparatus for harvesting brine shrimp roe from the surface of an open body of water onto a boat, the apparatus comprising:

(a) an endless movable skimming belt covered with a silk screen pad, the silk screen pad having openings sized to trap brine shrimp roe which are forced against the belt;

(b) rollers on which the belt revolves;

(c) a motor and gearing to revolve the belt around the rollers to elevate the harvested brine shrimp roe from the surface of the water into the boat; and (d) a frame to which the rollers and motor are mounted, said frame being capable of elevating the belt out of the open body of water when the belt is not in use so that the boat may maneuver freely without experiencing drag from the endless movable skimming belt.

2. A belt as recited in claim 1, wherein the silk screen pad is a No. 110 sized pad.

* * * * *